United States Patent
Zhao et al.

(10) Patent No.: US 11,407,424 B2
(45) Date of Patent: Aug. 9, 2022

(54) SYSTEM AND METHOD FOR TESTING AN ABILITY OF AN AUTOMATED VEHICLE TO PASS A TRAFFIC CIRCLE WITHOUT TRAFFIC LIGHTS

(71) Applicant: CHANG'AN UNIVERSITY, ShaanXi (CN)

(72) Inventors: Xiangmo Zhao, ShaanXi (CN); Runmin Wang, ShaanXi (CN); Zhigang Xu, ShaanXi (CN); Yu Zhu, ShaanXi (CN); Wenshuai Zhou, ShaanXi (CN); Zhanwen Liu, ShaanXi (CN); Pengpeng Sun, ShaanXi (CN); Ying Guo, ShaanXi (CN); Lan Yang, ShaanXi (CN)

(73) Assignee: CHANG'AN UNIVERSITY, Xi'an (CN)

( * ) Notice: Subject to any disclaimer, the term of this patent is extended or adjusted under 35 U.S.C. 154(b) by 31 days.

(21) Appl. No.: 17/134,398

(22) Filed: Dec. 26, 2020

(65) Prior Publication Data
US 2021/0221392 A1 Jul. 22, 2021

(51) Int. Cl.
*B60W 50/04* (2006.01)
*B60W 60/00* (2020.01)
(Continued)

(52) U.S. Cl.
CPC ........ *B60W 50/045* (2013.01); *B60W 40/112* (2013.01); *B60W 60/0025* (2020.02);
(Continued)

(58) Field of Classification Search
CPC .......... G08G 1/01; G08G 1/017; G08G 1/005; G08G 1/048; G08G 1/056; G08G 1/00;
(Continued)

(56) References Cited

U.S. PATENT DOCUMENTS 10,032,379 B1 * 7/2018 Chambers .............. G08G 1/162
10,217,357 B1 * 2/2019 Elsheemy ................ B60Q 9/00
(Continued)

FOREIGN PATENT DOCUMENTS

CN       108645628 A    10/2018
CN       108932840 A    12/2018
(Continued)

OTHER PUBLICATIONS

Pan Hanzhong, Chinese Patent CN 108645628 A; title "Automatic driving test system based on road driving skills", published on Oct. 12, 2018.*
(Continued)

*Primary Examiner* — Cuong H Nguyen (57) ABSTRACT

Provided are a system and a method for testing an ability of an automated vehicle to pass a traffic circle without traffic lights. The system includes an automated vehicle, a traffic circle, a control center, an attitude sensor and a panorama camera. In the method, the control center receives a test request and then sends a driving command to drive the automated vehicle to enter the traffic circle to start the test. The attitude sensor obtains a tilt angle and sends it to the control center in real time. The panorama camera is configured to obtain a driving trajectory, a driving speed and a state of turn signals of the automated vehicle. The obtained information is compared to a standard by the control center to evaluate the ability of the automated vehicle to pass the traffic circle without traffic lights.

7 Claims, 4 Drawing Sheets

(51) Int. Cl.
*B60W 40/112* (2012.01)
*G01M 17/007* (2006.01)
*B60W 40/072* (2012.01)

(52) U.S. Cl.
CPC ........ *G01M 17/007* (2013.01); *B60W 40/072* (2013.01); *B60W 2420/42* (2013.01); *B60W 2552/05* (2020.02); *B60W 2554/4029* (2020.02)

(58) Field of Classification Search
CPC ....... H04N 7/183; G06K 9/00; G03M 17/007; G05D 1/00; B60W 2552/00; B60W 2420/403
USPC ................. 701/117; 340/907; 362/464, 917
See application file for complete search history.

(56) References Cited

U.S. PATENT DOCUMENTS

| | | | | |
|---|---|---|---|---|
| 10,337,865 | B2* | 7/2019 | Green | H04N 7/183 |
| 10,875,528 | B2* | 12/2020 | Shalev-Shwartz | B60W 50/10 |
| 10,909,843 | B2* | 2/2021 | Chambers | G08G 1/163 |
| 11,067,995 | B2* | 7/2021 | Weiser | G06N 3/02 |
| 11,148,664 | B2* | 10/2021 | Finelt | G06V 20/58 |
| 11,220,214 | B1* | 1/2022 | Meier | H04N 5/247 |
| 11,263,770 | B2* | 3/2022 | Stein | G05D 1/0274 |
| 2015/0097957 | A1* | 4/2015 | Crona | G08G 1/056 |
| | | | | 348/149 |
| 2020/0007661 | A1* | 1/2020 | Kim | G08G 1/161 |
| 2021/0055102 | A1* | 2/2021 | Richter | G01S 19/13 |
| 2021/0104165 | A1* | 4/2021 | Jacobus | H04W 4/02 |
| 2022/0164980 | A1* | 5/2022 | Stein | G06V 20/584 |

FOREIGN PATENT DOCUMENTS

| | | | | |
|---|---|---|---|---|
| WO | WO-2019195415 | A1* | 10/2019 | B60W 30/08 |
| WO | WO-2020076280 | A1* | 4/2020 | B60K 35/00 |

OTHER PUBLICATIONS

Red Light Running at Traffic Circles: Estimation and Evaluation of Countermeasures Effectiveness A thesis presented by Boris Raul Claros, May 2013.*

B. Bartin, K. Ozbay, O. Yanmaz and N. Rathi, "Modeling and simulation of an unconventional traffic circle," Proceedings. 2005 IEEE Intelligent Transportation Systems, 2005., 2005, pp. 384-389, doi: 10.1109/ITSC.2005.1520079. (Year: 2005).*

H. Wang, B. Long and S. Tian, "Spiral-Shaped Driveways: A Novel Method for Traffic Circles," in IEEE Intelligent Transportation Systems Magazine, vol. 2, No. 1, pp. 18-23, Spring 2010, doi: 10.1109/MITS.2010.937291. (Year: 2010).*

A. Lamprecht, J. Haeckerand K. Graichen, "Constrained Motion Cueing for Driving Simulators Using a Real-Time Nonlinear MPC Scheme," 2018 IEEE/RSJ International Conference on Intelligent Robots and Systems (IROS), 2018, pp. 7466-7471, doi: 10.1109/IROS.2018.8594246. (Year: 2018).*

M. Spanu et al., "Smart Cities Mobility Monitoring through Automatic License Plate Recognition and Vehicle Discrimination," 2021 IEEE International Symposium on Broadband Multimedia Systems and Broadcasting (BMSB), 2021, pp. 1-6, doi: 10.1109/BMSB53066.2021.9547163 (Year: 2021).*

Spiral Shaped Driveways A Novel Method for Traffic Circles; Wang et al.; IEEE Intelligent Transportation Systems Magazine • 22 • Spring 2010 (Year: 2010).*

* cited by examiner

SYSTEM AND METHOD FOR TESTING AN ABILITY OF AN AUTOMATED VEHICLE TO PASS A TRAFFIC CIRCLE WITHOUT TRAFFIC LIGHTS

CROSS-REFERENCE TO RELATED APPLICATIONS

This application claims the benefit of priority from Chinese Patent Application No. 202010075003.7, filed on Jan. 22, 2020. The content of the aforementioned applications, including any intervening amendments thereto, is incorporated herein by reference in its entirety.

TECHNICAL FIELD

The present disclosure relates to performance testing of an automated vehicle, and more particularly to a system and a method for testing an ability of an automated vehicle to pass a traffic circle without traffic lights.

BACKGROUND

Automated cars are intelligent vehicles that integrate functions of environment perception, decision planning, control and execution, and have been a dominant trend of automotive technology in the future. With the development of a series of significant techniques, driverless car provides a new solution for traffic accidents and congestion, environmental pollution and energy crisis. A comprehensive and scientific test-verification-evaluation system plays an important role in improving the research efficiency of the driverless car, perfecting relevant laws and regulations and promoting the development of intelligent transportation.

Traffic circle, a special form of traffic node, belongs to road intersections on a plane and includes a circular lane and a central island. At the traffic circles without traffic lights, vehicles need to drive around the traffic circle and exit the traffic circle from an exit thereof. As for driverless cars, they need to identify traffic circles, plan driving routes, avoid conflicts with an oncoming vehicle, and correctly identify an exit of the traffic circle to drive away from the traffic circle. Therefore, it is of great significance to carry out a test for evaluating an ability of a driverless car to pass a traffic circle without traffic lights to test the driving ability of driverless cars.

However, there is still a lack of a test field and a method for testing an ability of a driverless car to pass a traffic circle without traffic lights which is close to the real road environment. If the optimization of vehicle operation tasks only relies on the simulation of operating scenes, the actual traffic operation status of the driverless cars cannot be accurately obtained. In addition, the operating scenes are hard to reproduce, so the tests are not scientific and theoretical enough, which limits their values to guide practical applications. Therefore, there is an urgent need to develop a system and a method for testing an ability of an automated vehicle to pass a traffic circle without traffic lights which is close to the real road environment.

SUMMARY

In order to solve the problems in the prior art, the present disclosure provides a system for testing an ability of an automated vehicle to pass a traffic circle without traffic lights, which has a simple structure. In the present application, a standard test for evaluating an ability of an automated vehicle to pass a traffic circle without traffic lights is provided to fill a void of the existing automated vehicle tests. In addition, the system of the present application solves the problem that it is difficult to reproduce a scene of traffic circles without traffic lights in an urban environment, simplifies the existing test methods and reduces the test cost. An attitude sensor is provided on an automated vehicle to detect a tilt angle of the automated vehicle, and a 360-degree panoramic camera is configured to obtain driving information of the automated vehicles, and the obtained driving information includes a driving trajectory, a driving speed and a state of turn signals of the automated vehicle. In this way, the ability of the automated vehicle to pass the traffic circle without traffic lights is tested with the high efficiency and low cost.

To achieve what mentioned above, the present disclosure provides the technical solutions as follows.

In a first aspect, the present application provides a system for testing an ability of an automated vehicle to pass a traffic circle without traffic lights, comprising:
an automated vehicle;
a traffic circle; and
a control center;
wherein an attitude sensor is provided on the automated vehicle and connected to the control center through a wireless communication device; and
a panorama camera is arranged at a center of the traffic circle and connected to the control center through a wireless communication device.

In some embodiments, the attitude sensor is configured to obtain a tilt angle of the automated vehicle and send obtained tilt angle to the control center; and
the panorama camera is configured to obtain a driving trajectory, a driving speed and a state of turn signals of the automated vehicle and send them to the control center.

In some embodiments, the control center is configured to compare obtained tilt angle with a predetermined tilt angle of the automated vehicle, and compare the obtained driving trajectory, driving speed and state of turn signals with a predetermined driving trajectory, driving speed and state of turn signals respectively to evaluate the ability of the automated vehicle to pass the traffic circle without traffic lights; and the control center is further configured to send a driving command to the automated vehicle.

In some embodiments, an evaluation criterion is established to determine whether the automated vehicle is qualified to pass the traffic circle without traffic lights; and
the automated vehicle is qualified if it meets the following conditions:
the automated vehicle turns on a right blinker when entering or exiting the traffic circle, and makes a turn after the right blinker flashes for at least 3 seconds;
the tilt angle of the automated vehicle is less than the predetermined tilt angle during the turn;
the automated vehicle drives within a lane without moving across an edge line of the lane, and exits from a correct exit;
the driving speed of the automated vehicle is within a predetermined speed range; and
a driving time of the automated vehicle from a starting point to an end point during a test is less than 3 minutes;
otherwise the automated vehicle is not qualified.

In some embodiments, the system further comprises a security officer;
wherein the automated vehicle is driven by the security officer to the starting point during a test under a manual mode, and is switched to an autonomous mode after the automated vehicle is stopped at the starting point.

In a second aspect, the present application provides a method for testing an ability of an automated vehicle to pass a traffic circle without traffic lights, comprising:

1) driving, by the security officer, the automated vehicle to the starting point during a test under the manual mode; and stopping the automated vehicle at the starting point;

2) turning on the panorama camera provided at a center of the traffic circle, and ensuring that an attitude sensor on the automated vehicle works normally;

3) sending, by the security officer, a test request to a control center; sending, by the control center, a driving command to the automated vehicle according to the received test request; turning on, by the security officer, the autonomous mode of the automated vehicle according to the received driving command; and enabling the automated vehicle to enter the traffic circle to start the test;

4) obtaining, by the attitude sensor, the tilt angle of the automated vehicle in real time; sending, by the attitude sensor, obtained tilt angle to the control center in real time; recording, by the panorama camera, a driving video of the automated vehicle, wherein the driving video comprises the driving trajectory, the driving speed and the state of turn signals of the automated vehicle; and sending, by the panorama camera, the driving video to the control center; and 5) comparing, by the control center, the obtained tilt angle to a predetermined tilt angle of the automated vehicle; and comparing obtained driving trajectory, driving speed and state of turn signals of the automated vehicle to a predetermined driving trajectory, driving speed and state of turn signals respectively to evaluate the ability of the automated vehicle to pass the traffic circle without traffic lights.

In some embodiments, in step 3), during the test, when the automated vehicle drives into an entrance of the traffic circle, a target vehicle drives into the entrance of the traffic circle.

In some embodiments, wherein in step 3), during the test, when the automated vehicle drives away from an exit of the traffic circle, a target vehicle drives away from the exit of the traffic circle.

In some embodiments, wherein in step 3), during the test, when the automated vehicle drives away from an exit of the traffic circle, a pedestrian passes through a crosswalk at the exit of the traffic circle.

Compared to the prior art, the present disclosure has the beneficial effects shown as follows.

1) The system of the present disclosure includes a control center, a traffic circle, a panorama camera and an attitude sensor to evaluate the ability of an automated vehicle to pass a traffic circle without traffic lights in an urban environment. The panorama camera is provided at a center of the traffic circle to obtain driving images of the automated vehicle passing through the traffic circle. The attitude sensor is provided on the automated vehicle to obtain attitude information of the automated vehicle while driving around the traffic circle. In this way, the driving capacity of the automated vehicle is evaluated.

2) In the present disclosure, it is simple and convenient to carry out the test. In addition, the automated vehicle is tested in an environment closer to a real driving situation, so that test results can more accurately show the ability of the automated vehicle to pass the traffic circle without traffic lights in the urban environment. The automated vehicle is tested with a safer process as opposed to being tested in real traffic situations. Compared to a virtual simulation test, the test of the present application is carried out in an environment closer to a real traffic environment, so the test results are more realistic and reliable.

3) The present disclosure provides a method for testing the ability of an automated vehicle to pass a traffic circle without traffic lights. A driving command is sent to the automated vehicle, and the automated vehicle responses accordingly and passes through the traffic circle correctly. Meanwhile, the system of the present application obtains operating data of the automated vehicle during the test. The test results are combined with the actual operating data, which are closer to real road conditions of the automated vehicle, rendering the method of the present application safer, and more authentic and reliable.

BRIEF DESCRIPTION OF THE DRAWINGS

The present disclosure will be described in detail with reference to the accompanying drawings and the embodiments.

in the drawings: V1, automated vehicle; V2, target vehicle; Z1, control center; M1, panorama camera; H1, pedestrian; L1, starting point; and L3, end point.

DETAILED DESCRIPTION OF EMBODIMENTS

The present disclosure will be described in detail with reference to the embodiments. For those skilled in the art, it should be understood that the embodiments are only illustrative, and not intended to limit the scope of the present disclosure.

A system for testing an ability of an automated vehicle to pass a traffic circle without traffic lights includes an automated vehicle, a traffic circle and a control center. There are four entrance-exit areas in the traffic circle. The traffic circle has a two-lane ring road, and each entrance-exit area of the traffic circle is a bidirectional and two-lane straight road. A lane width is 3.5 m; a diameter of a central island of the traffic circle is 20 m; and a radius of a curb is 5 m.

An attitude sensor is provided on the automated vehicle, and connected to the control center through a wireless communication device following a vehicle-to-everything (V2X) communication protocol. The attitude sensor is configured to obtain a tilt angle of the automated vehicle and send the obtained tilt angle to the control center. When passing a curve road of the traffic circle, the automated vehicle needs to adjust its attitude to prevent the rollover. The attitude of the automated vehicle is recorded by the attitude sensor, and is analyzed after the test to evaluate the ability of the automated vehicle to pass the traffic circle without traffic lights.

A panorama camera is arranged at a center of the traffic circle, connected to the control center through a wireless communication device, and able to record a video covering an entire test site and send the video to the control center.

The video includes a driving trajectory, a driving speed and a state of turn signals of the automated vehicle.

The control center includes a wireless communication device following the V2X communication protocol, and is able to send a driving command to the automated vehicle, compare obtained tilt angle with a predetermined tilt angle of the automated vehicle, and compare obtained driving trajectory, driving speed and state of turn signals with a predetermined driving trajectory, driving speed and state of turn signals respectively to evaluate the ability of the automated vehicle to pass the traffic circle without traffic lights.

The ability of the automated vehicle to pass the traffic circle without traffic lights is evaluated through the following criterion.

Specifically, the automated vehicle is qualified if it meets the following conditions:

the automated vehicle turns on a right blinker when entering or exiting the traffic circle, and makes a turn after the right blinker flashes for at least 3 seconds;

the tilt angle of the automated vehicle is less than the predetermined tilt angle during the turn;

the automated vehicle drives within a lane without moving across an edge line of the lane, and exits from a correct exit;

the driving speed of the automated vehicle is within a predetermined speed range; and a driving time of the automated vehicle from a starting point to an end point during a test is less than 3 minutes;

otherwise the automated vehicle is not qualified.

The automated vehicle is driven by a security officer to a starting point during a test under a manual mode, and is switched to an autonomous mode after the automated vehicle is stopped at the starting point.

The method of the present application will be described in detail with reference to the embodiments.

Embodiment 1

Figure 1:
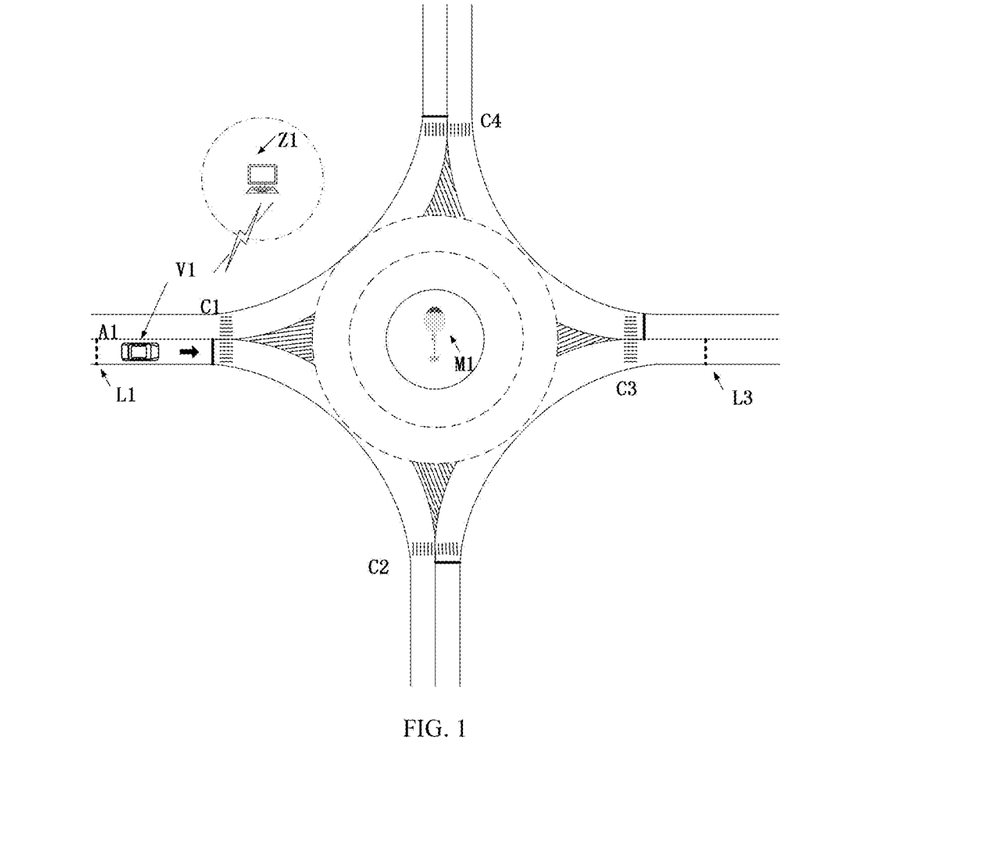
FIG. 1 is a schematic diagram of a test site where an automated vehicle enters a traffic circle, drives within a lane in the traffic circle and drives away from the traffic circle.

As shown in FIG. 1, a method for testing an ability of an automated vehicle to pass a traffic circle without traffic lights is used to test an ability of the automated vehicle to enter the traffic circle, drive within a lane in the traffic circle and drive away from the traffic circle. There are four entrance-exit areas in the traffic circle. Each entrance-exit area includes at least a bidirectional and two-lane ring road, an automated vehicle V1, a control center Z1, a panorama camera M1 and a lane A1 through which the automated vehicle V1 enters the traffic circle. The automated vehicle V1 starts the test from a starting point L1. C1, C2, C3 and C4 are four entrance-exit areas of the traffic circle. The steps of the method are shown as follows.

(1) The automated vehicle V1 is driven by a security officer to the starting point L1 during the test under a manual mode, and is stopped at the starting point L1.

(2) The panorama camera M1 provided at a center of the traffic circle is turned on, and an attitude sensor provided on the automated vehicle V1 is ensured that it works normally.

(3) The security officer sends a test request to the control center Z1. The control center Z1 sends a driving command to the automated vehicle V1 through a wireless communication device according to the received test request. The security officer turns on an autonomous mode of the automated vehicle V1 according to the driving command received by the automated vehicle V1. The automated vehicle V1 starts from the starting point L1, enters a test site, accelerates on the lane A1 to 30 km/h and then drives within the lane at a constant speed, and finally exits from an end point L3 during the test to evaluate the ability of the automated vehicle to pass the traffic circle without traffic lights.

(4) The attitude sensor obtains a tilt angle of the automated vehicle V1 in real time and sends the obtained tilt angle to the control center Z1. The panorama camera M1 records a driving video of the automated vehicle V1 and sends the driving video to the control center Z1. The driving video includes a driving trajectory, a driving speed and a state of turn signals of the automated vehicle V1.

(5) The control center Z1 compares obtained tilt angle with a predetermined tilt angle of the automated vehicle V1, and compares obtained driving trajectory, driving speed and state of turn signals with a predetermined driving trajectory, driving speed and state of turn signals respectively to evaluate the ability of the automated vehicle to pass the traffic circle without traffic lights.

An evaluation criterion is established to determine whether the automated vehicle is qualified to pass the traffic circle without traffic lights. If the automated vehicle meets the following conditions:

the automated vehicle V1 turns on a right blinker when driving close to the traffic circle, and makes a turn after the right blinker flashes for at least 3 seconds;

the automated vehicle V1 drives within the lane in the traffic circle;

after the automated vehicle passes at least one exit, a turn signal of the automated vehicle is turned on, and the automated vehicle makes a turn after the turn signal is turned on for at least three seconds and proceeds toward the end point L3 to finish the test;

the tilt angle of the automated vehicle V1 is less than the predetermined tilt angle (that is, a tilt angle of a vehicle when the vehicle overturns) during the turn;

the automated vehicle V1 drives within a lane without attaching an edge of the lane line, and exits from a correct exit;

the driving speed of the automated vehicle V1 is within a predetermined speed range; and a driving time of the automated vehicle V1 from the starting point to the end point during the test is less than 3 minutes;

the automated vehicle is qualified;

otherwise, the automated vehicle is not qualified.

After receiving the driving command issued by the control center Z1, the automated vehicle V1 enters the traffic circle and detects lane lines by the sensor equipped on the automated vehicle V1 to stably drive within the lane. During the driving process, if the automated vehicle is able to detect and recognize the entrance of the traffic circle, plan the driving route, adjust its own attitude to stably drive within the lane of the curve road, and identify the exit of the traffic circle to reach the end point during the test, the automated vehicle is qualified.

Embodiment 2

Figure 2:
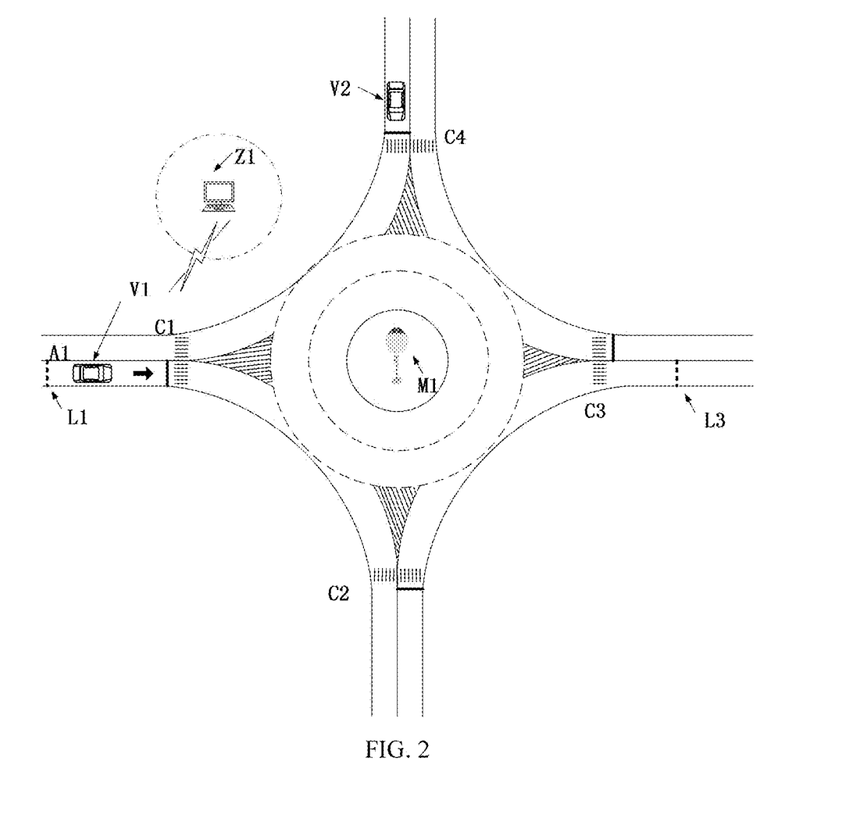
FIG. 2 is a schematic diagram of a test site where an automated vehicle enters a traffic circle and avoids path conflicts with an oncoming vehicle.

As shown in FIG. 2, a method for testing an ability of an automated vehicle to pass a traffic circle without traffic lights is used to test an ability of the automated vehicle to avoid path conflicts with an oncoming vehicle when the automated vehicle enters a traffic circle. There are four entrance-exit areas in the traffic circle. Each entrance-exit area includes at least a bidirectional and two-lane ring road, an automated vehicle V1, a target vehicle V2, a control center Z1, a panorama camera M1, a lane A1 through which the automated vehicle V1 enters the traffic circle, an outer lane B1 of the traffic circle and an inner lane B2 of the traffic circle. The automated vehicle V1 starts the test from a starting point L1. C1, C2, C3 and C4 are four entrance-exit areas of the traffic circle. The target vehicle V2 is a special mobile platform for testing, equipped with a test-specific dummy vehicle, and the target vehicle V2 is prepared at the entrance C4 and waits for a starting command. The steps of the method are shown as follows.

(1) The automated vehicle V1 is driven by a security officer to the starting point L1 during the test under a manual mode, and is stopped at the starting point L1.

(2) The panorama camera M1 provided at a center of the traffic circle is turned on, and an attitude sensor provided on the automated vehicle V1 is ensured that it works normally.

(3) The security officer sends a test request to the control center Z1. The control center Z1 sends a driving command to the automated vehicle V1 through a wireless communication device according to the received test request. The security officer turns on an autonomous mode of the automated vehicle V1 according to the driving command received by the automated vehicle V1. The automated vehicle V1 starts from the starting point L1, enters a test site, accelerates on the lane A1 to 30 km/h and then drives within the lane at a constant speed to drive towards the traffic circle, meanwhile, a tester controls the target vehicle V2 to enter the traffic circle from the entrance C4 by a remote control handle. The target vehicle V2 drives, at a speed of 35 km/h, into the lane B1 through which the automated vehicle V1 will enter to test an ability of the automated vehicle to avoid path conflicts with an oncoming vehicle when the automated vehicle drives into the traffic circle.

(4) The attitude sensor obtains a tilt angle of the automated vehicle V1 in real time and sends the obtained tilt angle to the control center Z1. The panorama camera M1 records a driving video of the automated vehicle V1 and sends the driving video to the control center Z1. The driving video includes a driving trajectory, a driving speed and a state of turn signals of the automated vehicle V1.

(5) The control center Z1 compares obtained tilt angle with a predetermined tilt angle of the automated vehicle V1, and compares obtained driving trajectory, driving speed and state of turn signals with a predetermined driving trajectory, driving speed and state of turn signals respectively to evaluate the ability of the automated vehicle to pass the traffic circle without traffic lights.

An evaluation criterion is established to determine whether the automated vehicle is qualified to pass the traffic circle without traffic lights. If automated vehicle meets the following conditions:

the automated vehicle V1 turns on a blinker when driving close to the traffic circle, makes a turn after the blinker flashes for at least 3 seconds and proceeds toward the traffic circle;

the automated vehicle V1 detects the upcoming upstream target vehicle V2 by a sensor equipped on the automated vehicle V1, and slows down or stops to wait for the target vehicle V2 to pass;

after the target vehicle V2 passes, the automated vehicle enters the traffic circle and drives within the lane in the traffic circle;

after the automated vehicle passes at least one exit, a turn signal of the automated vehicle is turned on, and the automated vehicle makes a turn after the turn signal is turned on for at least three seconds and proceeds toward the end point L3 to finish the test;

the tilt angle of the automated vehicle V1 is less than the predetermined tilt angle during the turn;

the automated vehicle V1 drives within a lane without attaching an edge of the lane line, and exits from a correct exit;

the driving speed of the automated vehicle V1 is within a predetermined speed range; and a driving time of the automated vehicle V1 from the starting point to the end point during the test is less than 3 minutes;

the automated vehicle is qualified;

otherwise, the automated vehicle is not qualified.

The automated vehicle V1 is switched on. According to the received driving command, the automated vehicle V1 starts from the starting point and enters the test site. At the same time, the tester controls the target vehicle V2 to enter the traffic circle by the remote control handle, and the target vehicle V2 drives on the lane B1. After receiving the driving command issued by the control center Z1, the automated vehicle V1 enters the traffic circle and detects vehicles near the lane line and the path, so as to avoid path conflicts with an oncoming vehicle and drive safely to the end point during the test. During the driving process, if the automated vehicle is able to detect and recognize the entrance of the traffic circle, plan the driving route, adjust its own attitude to stably drive within the lane of the curve road, and identify the exit of the traffic circle to reach the end point during the test, the automated vehicle is qualified.

Embodiment 3

Figure 3:
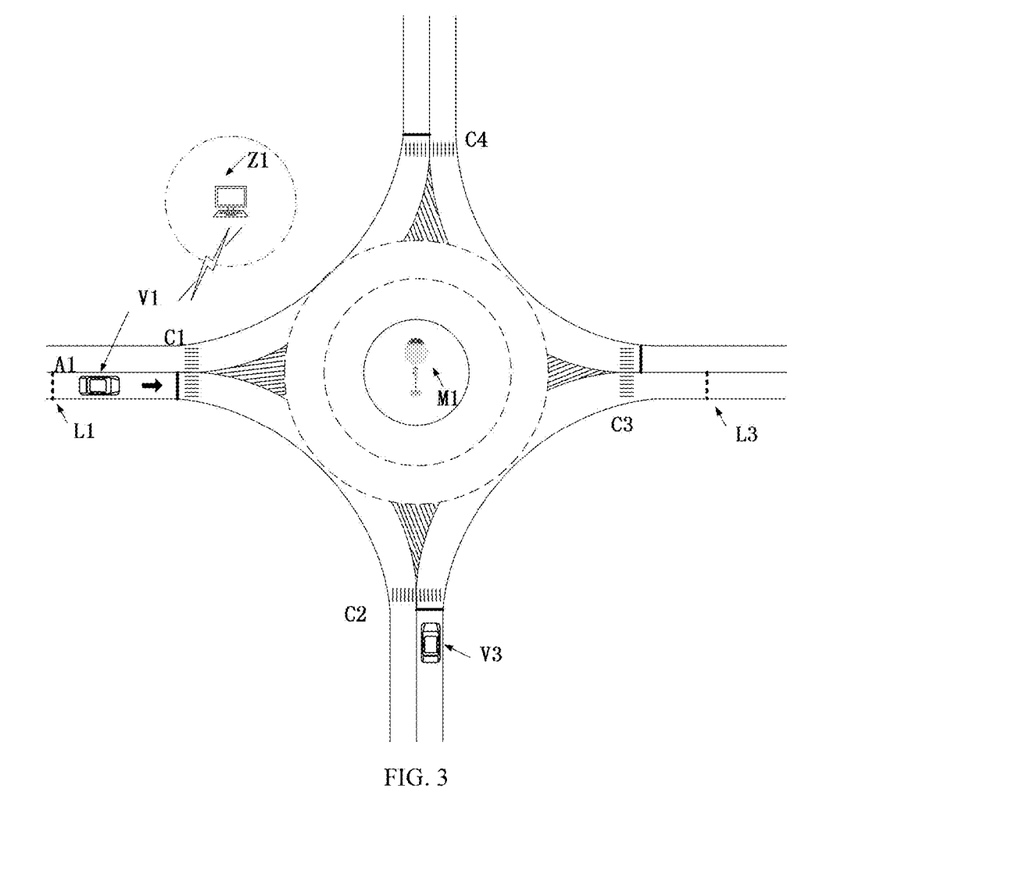
FIG. 3 is a schematic diagram of a test site where an automated vehicle drives away from a traffic circle and avoids path conflicts with an oncoming vehicle.

As shown in FIG. 3, a method for testing an ability of an automated vehicle to pass a traffic circle without traffic lights is used to test an ability of the automated vehicle to avoid path conflicts with an oncoming vehicle when the automated vehicle enters a traffic circle. There are four entrance-exit areas in the traffic circle. Each entrance-exit area includes at least a bidirectional and two-lane ring road, an automated vehicle V1, a target vehicle V2, a control center Z1, a panorama camera M1, a lane A1 through which the automated vehicle V1 enters the traffic circle, an outer lane B1 of the traffic circle and an inner lane B2 of the traffic circle. The automated vehicle V1 starts the test from a starting point L1. C1, C2, C3 and C4 are four entrance-exit areas of the traffic circle. The target vehicle V2 is a special mobile platform for testing, equipped with a test-specific dummy vehicle, and the target vehicle V2 is prepared at the entrance C2 and waits for a starting command. The steps of the method are shown as follows.

(1) The automated vehicle V1 is driven by a security officer to the starting point L1 during the test under a manual mode, and is stopped at the starting point L1.

(2) The panorama camera M1 provided at a center of the traffic circle is turned on, and an attitude sensor provided on the automated vehicle V1 is ensured that it works normally.

(3) The security officer sends a test request to the control center Z1. The control center Z1 sends a driving command to the automated vehicle V1 through a wireless communication device according to the received test request. The security officer turns on an autonomous mode of the automated vehicle V1 according to the driving command received by the automated vehicle V1. The automated vehicle V1 starts from the starting point L1, enters a test site, accelerates on the lane A1 to 30 km/h and then drives within the lane at a constant speed to drive towards the traffic circle, and drives away from the exit C3 of the traffic circle; meanwhile, a tester controls the target vehicle V2 to enter the traffic circle from the entrance C2 by a remote control handle, and the target vehicle V2 drives on the lane B1 and passes through the exit C3 where the automated vehicle V1 will exit to test an ability of the automated vehicle to avoid path conflicts with an oncoming vehicle.

(4) The attitude sensor obtains a tilt angle of the automated vehicle V1 in real time and sends the obtained tilt angle to the control center Z1. The panorama camera M1 records a driving video of the automated vehicle V1 and sends the driving video to the control center Z1. The driving video includes a driving trajectory, a driving speed and a state of turn signals of the automated vehicle V1.

(5) The control center Z1 compares obtained tilt angle with a predetermined tilt angle of the automated vehicle V1, and compares obtained driving trajectory, driving speed and state of turn signals with a predetermined driving trajectory, driving speed and state of turn signals respectively to evaluate the ability of the automated vehicle to pass the traffic circle without traffic lights.

An evaluation criterion is established to determine whether the automated vehicle is qualified to pass the traffic circle without traffic lights. If automated vehicle meets the following conditions:

the automated vehicle V1 accelerates to 30 km/h in the lane A1 and then drives within the line at a constant speed to drive towards the traffic circle;

the automated vehicle V1 turns on a blinker when driving close to the entrance of the traffic circle, and makes a turn and enters the traffic circle after the blinker flashes for at least 3 seconds;

the automated vehicle V1 drives on the lane B2, and after passing at least one exit, the automated vehicle V1 exits the traffic circle; during the process of exiting the traffic circle, the automated vehicle V1 slows down or stops to avoid the target vehicle V2;

after the target vehicle V2 passes, the automated vehicle V1 turns on a blinker for at least 3 seconds, then exits the traffic circle from the exit C3 and proceeds toward the end point L3 to finish the test;

the tilt angle of the automated vehicle V1 is less than the predetermined tilt angle during the turn;

the automated vehicle V1 drives within a lane without moving across an edge line of the lane, and exits from a correct exit;

the driving speed of the automated vehicle V1 is within a predetermined speed range; and a driving time of the automated vehicle V1 from the starting point to the end point during the test is less than 3 minutes;

the automated vehicle is not qualified;

otherwise, the automated vehicle is not qualified.

The automated vehicle V1 is switched on. According to the received driving command, the automated vehicle V1 starts from the starting point and enters the test site. At the same time, the tester controls the target vehicle V2 to enter the traffic circle by the remote control handle, and the target vehicle V2 drives on the lane B1. After receiving the driving command issued by the control center Z1, the automated vehicle V1 enters the traffic circle and detects vehicles near the lane line and the path using a sensor equipped on the automated vehicle, so as to avoid path conflicts with an oncoming vehicle and drive safely to the end point during the test. During the driving process, if the automated vehicle is able to plan the route, detect the vehicle that conflicts with the route, avoid path conflicts with the oncoming vehicle and finally drive toward the end point correctly during the test, the automated vehicle is qualified.

Embodiment 4

Figure 4:
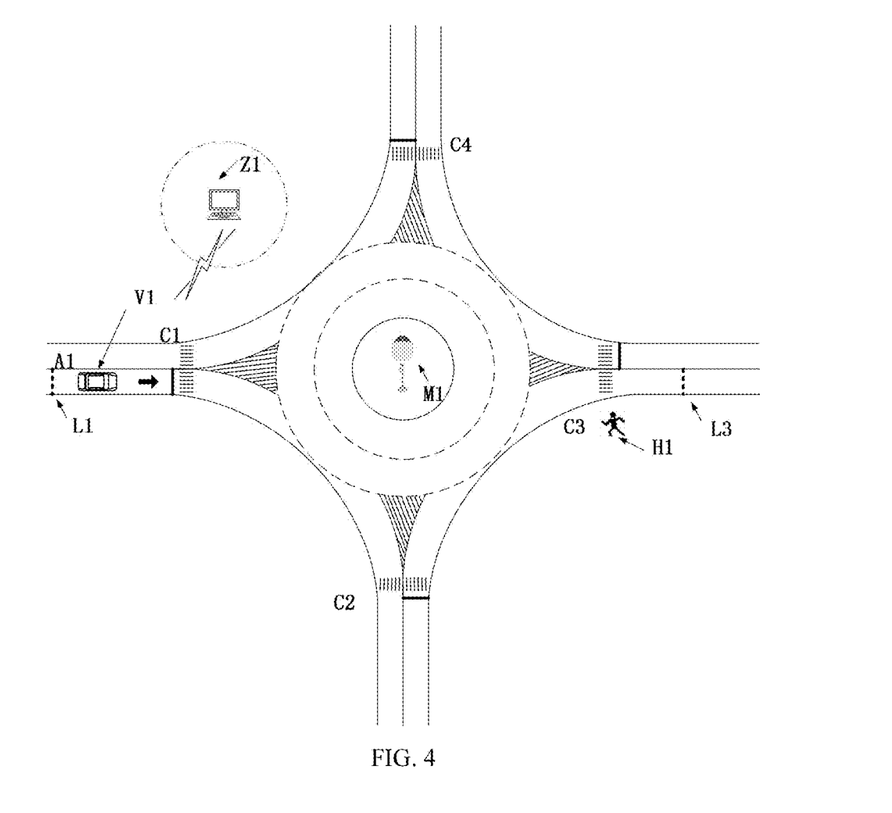
FIG. 4 is a schematic diagram of a test site where an automated vehicle drives away from a traffic circle and avoids a pedestrian.

As shown in FIG. 4, a method for testing an ability of an automated vehicle to pass a traffic circle without traffic lights is used to test an ability of the automated vehicle to avoid a pedestrian when the automated vehicle exits a traffic circle. There are four entrance-exit areas in the traffic circle. Each entrance-exit area includes at least a bidirectional and two-lane ring road, an automated vehicle V1, a pedestrian H1, a control center Z1, a panorama camera M1, a lane A1 through which the automated vehicle V1 enters the traffic circle, an outer lane B1 of the traffic circle and an inner lane B2 of the traffic circle. The automated vehicle V1 starts the test from a starting point L1. C1, C2, C3 and C4 are four entrance-exit areas of the traffic circle. The pedestrian H1 is a special mobile platform for testing, equipped with a test-specific dummy pedestrian, and the pedestrian H1 is prepared at a crosswalk of the exit C3 and waits for a starting command. The steps of the method are shown as follows.

(1) The automated vehicle V1 is driven by a security officer to the starting point L1 during the test under a manual mode, and is stopped at the starting point L1.

(2) The panorama camera M1 provided at a center of the traffic circle is turned on, and an attitude sensor provided on the automated vehicle V1 is ensured that it works normally.

(3) The security officer sends a test request to the control center Z1. The control center Z1 sends a driving command to the automated vehicle V1 through a wireless communication device according to the received test request. The security officer turns on an autonomous mode of the automated vehicle V1 according to the driving command received by the automated vehicle V1. The automated vehicle V1 starts from the starting point L1, enters a test site, accelerates on the lane A1 to 30 km/h and then drives within the lane at a constant speed to drive towards the traffic circle. The automated vehicle V1 then drives on the lane B2 and drives away from the exit C3 of the traffic circle, meanwhile, the pedestrian H1 starts to pass through the crosswalk to test an ability of the automated vehicle to avoid the pedestrian when the automated vehicle drives way from the traffic circle.

(4) The attitude sensor obtains a tilt angle of the automated vehicle V1 in real time and sends the obtained tilt angle to the control center Z1. The panorama camera M1 records a driving video of the automated vehicle V1 and sends the driving video to the control center Z1. The driving video includes a driving trajectory, a driving speed and a state of turn signals of the automated vehicle V1.

(5) The control center Z1 compares obtained tilt angle with a predetermined tilt angle of the automated vehicle V1, and compares obtained driving trajectory, driving speed and state of turn signals with a predetermined driving trajectory, driving speed and state of turn signals respectively to evaluate the ability of the automated vehicle to pass the traffic circle without traffic lights.

An evaluation criterion is established to determine whether the automated vehicle is qualified to pass the traffic circle without traffic lights. If the automated vehicle meets the following conditions:

the automated vehicle V1 accelerates to 30 km/h on the lane A1, drives within the lane at a constant speed to drive towards the traffic circle;

the automated vehicle V1 turns on a blinker when driving close an entrance of the traffic circle, and makes a turn and enters the traffic circle after the blinker flashes for at least 3 seconds;

the automated vehicle V1 drives on the lane B2, and after passing at least one exit, the automated vehicle V1 exits the traffic circle;

during the process of exiting the traffic circle, the automated vehicle V1 slows down or stops to avoid the pedestrian H1;

after the pedestrian H1 passes, the automated vehicle V1 turns on a blinker after the blinker flashes for at least 3 seconds, exits the traffic circle from the exit C3 and proceeds toward the end point L3 during the test;

the tilt angle of the automated vehicle V1 is less than the predetermined tilt angle during the turn;

the automated vehicle V1 drives within a lane line without moving across an edge line of the lane, and exits from a correct exit;

the driving speed of the automated vehicle V1 is within a predetermined speed range; and a driving time of the automated vehicle V1 from the starting point to the end point during the test is less than 3 minutes the automated vehicle is qualified;

otherwise, the automated vehicle is not qualified.

After receiving the driving command issued by a computer of the control center Z1, the automated vehicle V1 enters the traffic circle and detect vehicles or the pedestrian H1 near the lane line and the path using a sensor equipped on the automated vehicle V1, so as to avoid path conflicts with an oncoming vehicle or the pedestrian H1 and pass the traffic circle correctly. During the driving process, if the automated vehicle is able to plan the route, detect the pedestrian H1 that conflicts with the route, avoid path conflicts with the pedestrian H1 and finally exit the traffic circle correctly, the automated vehicle is qualified.

The present application has been described in detail with general descriptions and the embodiments. However, it is obvious that some modifications or improvements can still be made by those skilled in the art on the basis of the present application. Therefore, any modifications or improvements without departing from the spirit of the present application should fall within the scope of the present application.

What is claimed is:

1. A method for testing an ability of an automated vehicle to pass a traffic circle without traffic lights, comprising:
   1) driving, by a security officer, the automated vehicle to a starting point during a test under a manual mode; and stopping the automated vehicle at the starting point;
   2) turning on a panorama camera provided at a center of the traffic circle, and ensuring that an attitude sensor on the automated vehicle works normally;
   3) sending, by the security officer, a test request to a control center; sending, by the control center, a driving command to the automated vehicle according to the received test request; turning on, by the security officer, an autonomous mode of the automated vehicle according to the received driving command; and enabling the automated vehicle to enter the traffic circle to start the test;
   4) obtaining, by the attitude sensor, a tilt angle of the automated vehicle in real time; sending, by the attitude sensor, obtained tilt angle to the control center in real time; recording, by the panorama camera, a driving video of the automated vehicle, wherein the driving video comprises a driving trajectory, a driving speed and a state of turn signals of the automated vehicle; and sending, by the panorama camera, the driving video to the control center; and
   5) comparing, by the control center, the obtained tilt angle to a predetermined tilt angle of the automated vehicle; and comparing obtained driving trajectory, driving speed and state of turn signals of the automated vehicle to a predetermined driving trajectory, driving speed and state of turn signals respectively to evaluate the ability of the automated vehicle to pass the traffic circle without traffic lights.

2. The method of claim 1, wherein in step 3), during the test, when the automated vehicle drives away from an exit of the traffic circle, a pedestrian passes through a crosswalk at the exit of the traffic circle.

3. A system of clai for testing an ability of an automated vehicle to pass a traffic circle without traffic lights, comprising:
   an automated vehicle;
   a traffic circle; and
   a control center;
   wherein an attitude sensor is provided on the automated vehicle and connected to the control center through a wireless communication device; the attitude sensor is configured to obtain a tilt angle of the automated vehicle and send obtained tilt angle to the control center;
   a panorama camera is arranged at a center of the traffic circle and connected to the control center through a wireless communication device; the panorama camera is configured to obtain a driving trajectory, a driving speed and a state of turn signals of the automated vehicle and send them to the control center; and
   the control center is configured to compare obtained tilt angle with a predetermined tilt angle of the automated vehicle, and compare obtained driving trajectory, driving speed and state of turn signals with a predetermined driving trajectory, driving speed and state of turn signals respectively to evaluate the ability of the automated vehicle to pass the traffic circle without traffic lights; and the control center is further configured to send a driving command to the automated vehicle.

4. The system of claim 3, wherein an evaluation criterion is established to determine whether the automated vehicle is qualified to pass the traffic circle without traffic lights; and the automated vehicle is qualified if it meets the following conditions:
   the automated vehicle turns on a right blinker when entering or exiting the traffic circle, and makes a turn after the right blinker flashes for at least 3 seconds;
   the tilt angle of the automated vehicle is less than the predetermined tilt angle during the turn;
   the automated vehicle drives within a lane without moving across an edge line of the lane, and exits from a correct exit;
   the driving speed of the automated vehicle is within a predetermined speed range; and
   a driving time of the automated vehicle from a starting point to an end point during a test is less than 3 minutes;
   otherwise the automated vehicle is not qualified.

5. The system of claim 3, further comprising:
   a security officer;
   wherein the automated vehicle is driven by the security officer to a starting point during a test under a manual mode, and is switched to an autonomous mode after the automated vehicle is stopped at the starting point.

6. The method of claim 1, wherein in step 3), during the test, when the automated vehicle drives away from an exit of the traffic circle, a target vehicle drives away from the exit of the traffic circle.

7. The method of claim 1, wherein in step 3), during the test, when the automated vehicle drives into an entrance of the traffic circle, a target vehicle drives into the entrance of the traffic circle.

* * * * *

UNITED STATES PATENT AND TRADEMARK OFFICE
CERTIFICATE OF CORRECTION

| | | |
|---|---|---|
| PATENT NO. | : 11,407,424 B2 | Page 1 of 1 |
| APPLICATION NO. | : 17/134398 | |
| DATED | : August 9, 2022 | |
| INVENTOR(S) | : Xiangmo Zhao et al. | |

It is certified that error appears in the above-identified patent and that said Letters Patent is hereby corrected as shown below:

On the Title Page

Item (30), please add:
FOREIGN PRIORITY
CHINA 202010075003.7 01/22/2020

Signed and Sealed this
Thirteenth Day of September, 2022

Katherine Kelly Vidal
*Director of the United States Patent and Trademark Office*